(12) United States Patent
Detrick et al.

(10) Patent No.: US 7,278,016 B1
(45) Date of Patent: Oct. 2, 2007

(54) ENCRYPTION/DECRYPTION OF STORED DATA USING NON-ACCESSIBLE, UNIQUE ENCRYPTION KEY

(75) Inventors: Mark Steven Detrick, Sayre, PA (US); John Edward Fetkovich, Endicott, NY (US); George William Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/427,250

(22) Filed: Oct. 26, 1999

(51) Int. Cl.
*G06F 21/00* (2006.01)

(52) U.S. Cl. ............... 713/2; 713/1; 713/184; 713/194; 380/44

(58) Field of Classification Search ........ 380/44, 380/28; 713/190, 193, 194, 200, 183, 184, 713/195, 185, 1, 2; 726/3, 27
See application file for complete search history.

(56) References Cited

U.S. PATENT DOCUMENTS

| | | | |
|---|---|---|---|
| 4,757,534 A | 7/1988 | Matyas et al. ............ 380/25 |
| 4,813,912 A | 3/1989 | Chickneas et al. .......... 364/464 |
| 4,937,861 A * | 6/1990 | Cummins ................ 380/2 |
| 5,012,514 A * | 4/1991 | Renton ................. 713/192 |
| 5,034,914 A | 7/1991 | Osterlund ............... 364/900 |
| 5,237,611 A | 8/1993 | Rasmussen et al. ......... 380/21 |
| 5,513,262 A * | 4/1996 | van Rumpt et al. .......... 380/29 |
| 5,555,304 A | 9/1996 | Hasebe et al. ............. 380/4 |
| 5,570,242 A | 10/1996 | Leonhardt et al. .......... 360/48 |
| 5,598,476 A | 1/1997 | LaBarre et al. ............ 380/23 |
| 5,606,609 A | 2/1997 | Houser et al. ............ 380/4 |
| 5,677,952 A * | 10/1997 | Blakley et al. ............ 713/189 |
| 5,680,452 A | 10/1997 | Shanton ................. 380/4 |
| 5,757,908 A * | 5/1998 | Cooper et al. ............ 713/165 |
| 5,825,878 A | 10/1998 | Takahashi et al. .......... 380/4 |
| 5,923,754 A * | 7/1999 | Angelo et al. ............ 705/54 |
| 6,425,084 B1 * | 7/2002 | Rallis et al. ............ 713/185 |
| 6,473,861 B1 * | 10/2002 | Stokes ................. 713/193 |

FOREIGN PATENT DOCUMENTS

EP 0 121 853 10/1984

* cited by examiner

*Primary Examiner*—Emmanuel L. Moise
*Assistant Examiner*—Paul Callahan
(74) *Attorney, Agent, or Firm*—William H. Steinberg, Esq.; Kevin P. Radigan, Esq.; Heslin Rothenberg Farley & Mesiti, P.C.

(57) ABSTRACT

Encryption and decryption of data stored from a computing system to a storage medium is disclosed wherein the processing employs a non-accessible encryption key that is unique to the computing system. The unique encryption key can be embedded in non-removable hardware of the computing system or generated, e.g., from identification numbers ascertained from non-removable hardware of the computing system. Processing includes establishing the unique encryption key, encrypting data using the unique encryption key and storing the encrypted data to the storage medium without storing the unique encryption key on the storage medium. The storage medium can comprise any non-removable or removable storage medium, including for example a computer hard drive, floppy diskette, or recordable compact disk.

19 Claims, 5 Drawing Sheets

ENCRYPTION/DECRYPTION OF STORED DATA USING NON-ACCESSIBLE, UNIQUE ENCRYPTION KEY

TECHNICAL FIELD

The present invention generally relates to encryption and decryption of data, and more specifically, to a technique for implementing encryption and decryption of data stored from a computing system to a storage medium wherein the encryption and decryption employ a unique, non-accessible encryption key specific to the computing system.

BACKGROUND OF THE INVENTION

Procedures for encrypting and decrypting data for temporary or permanent storage, or transmission over non-secure links, are generally known in the art. Most encryption algorithms employ an encryption key to encrypt data. Successful use of an encryption algorithm thus typically requires that the station receiving the encrypted transmission or reading the encrypted data from storage have the same key used to encrypt the data in order to decrypt it. Accordingly, no unauthorized party should know or have access to the encryption key that is being used.

Encryption techniques are numerous, and many have been applied to computers and computer data. However, further enhancements are deemed desirable, particularly, in techniques for preventing an unauthorized party from having access to the encryption key.

DISCLOSURE OF THE INVENTION

More particular to the present invention, computer data is commonly stored on a hard disk drive. If the hard disk drive is used to store sensitive data, its loss or theft can pose a danger. Theft of disk drives may particularly be a threat to portable (i.e., laptop) computer systems, which are often easily opened.

Thus, there is a need in the art for an encryption/decryption approach which is transparent to a user application and which is based upon a unique property of the host machine to fashion an encryption key so that data encrypted from the machine cannot be decrypted without access to the machine.

Briefly summarized then, this invention comprises in one aspect a method for protecting data stored from a computing system to a storage medium. The method includes establishing a unique encryption key for the computing system; encrypting the data using the unique encryption key to produce encrypted data; and storing the encrypted data on the storage medium without storing the unique encryption key on the storage medium.

In another aspect, a system for protecting data stored from a computing system to a storage medium is provided. The system includes means for establishing a unique encryption key within the computing system, and means for encrypting the data using the unique encryption key to produce encrypted data. Means for storing the encrypted data on a storage medium is also provided, wherein the storing occurs without storing the unique encryption key on the storage medium.

In still another aspect, a processing system is presented which includes a storage medium for storing data and a computing system. The computing system is adapted to establish a unique encryption key, and to encrypt data using the unique encryption key to produce encrypted data. The computing system further includes a device driver and a drive controller for storing encrypted data to the storage medium.

In a further aspect, at least one program storage device is provided readable by a machine, tangibly embodying at least one program of instructions executable by the machine to perform a method for protecting data stored from a computing system to a storage medium. The method includes: establishing a unique encryption key within the computing system; encrypting the data using the unique encryption key to produce encrypted data; and storing the encrypted data on the storage medium without storing the unique encryption key on the storage medium.

To restate, in all embodiments, provided herein is a transparent technique for encrypting and decrypting data to be stored from a computing system to a removable or non-removable storage medium such as a hard disk drive, floppy diskette or compact disk. The encryption/decryption technique employs a unique, non-accessible encryption key specific to the computing system. The encryption key, along with encryption logic and decryption logic, can be embedded in hardware, for example, within the drive controller of the computing system. Alternatively, the encryption key, along with the encryption logic and decryption logic, can reside within software within the computing system.

If implemented within software, the unique encryption key can be derived by, for example, the computing system's device driver. Specifically, the device driver can be programmed to read one or more serial numbers (or other static information such as PCI configuration information, chip identification numbers, etc.) from non-removable hardware components of the computing system at time of initialization. These serial numbers could then be combined (for example, hashed) into the unique encryption key, thereby ensuring that data encrypted by the computing system can only be decrypted by that computing system.

Advantageously, the transparent encryption/decryption approach presented herein ensures that data in, for example, a hard disk drive, floppy diskette, or compact disk, would only be useful within the specific machine which stored the data. If the storage medium were relocated to a different machine, the medium would be inoperable. This is believed particularly valuable for portable computer users, the military, or any user with sensitive data to be protected. Preferably, the encryption and decryption employ an encryption key which is based on properties of the host machine, and therefore, inaccessible without decryption by the host machine. Further, in accordance with the present invention, no seed numbers need be presented to the computer from outside the computer in order to construct the unique encryption key.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, presented herein is a more secure method to encrypt digital data for storage either on removable or non-removable medium. Data protection is achieved by: deriving a unique number embedded within a computer writing to (or possessing) the data storage medium, with the number being embedded other than within the storage medium itself; encrypting data using the unique number as the basis of the encrypting; and after encrypting, storing the encrypted data within the data storage medium without storing the unique number on the data storage medium. Non-removable storage medium may comprise the computer's hard disk drive, while a removable medium might comprise a floppy disk, recordable compact disk, etc. By encrypting data using an encryption key unique to the particular computer storing the data, then the encrypted data can only be decrypted by the same computer.

The unique encryption key may comprise a number stored in a non-removable component of the computer, or the key may be derived by hashing (or otherwise mathematically combining) one or more numbers stored in non-removable components. For example, the unique number might be a serial number embedded in the computer's processor, or other components integrated into the motherboard. One requirement, however, is that the number used as the basis for the encryption key not be stored on the same medium as the data that is encrypted.

Figure 1:
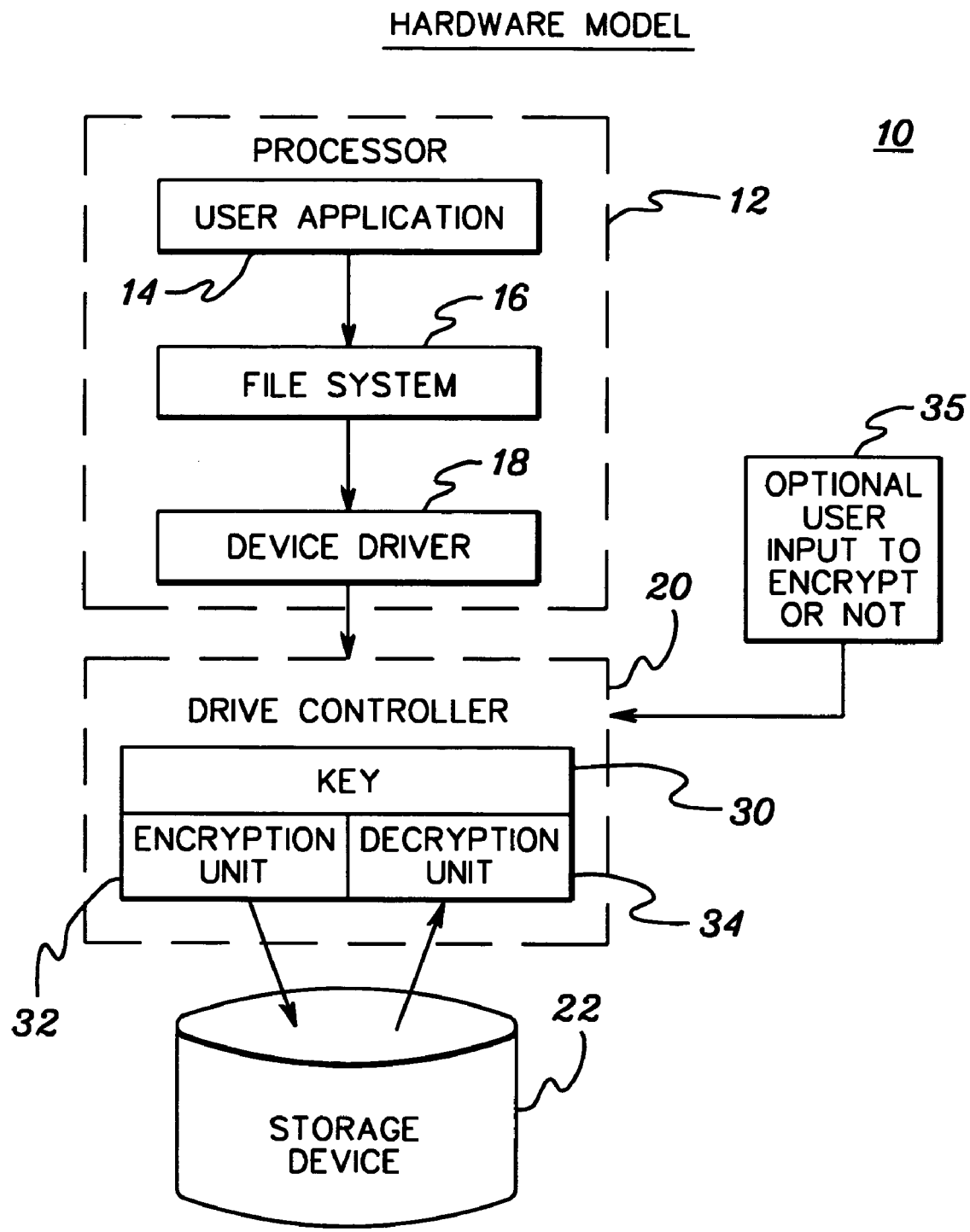
FIG. 1 depicts one embodiment of a computing system implementing encryption/decryption capabilities in accordance with the principles of the present invention, wherein the encryption/decryption capabilities are implemented in hardware using an embedded encryption key.

The encryption of data before storage, and decryption of data after being fetched from storage, may be performed in either hardware or software. FIG. 1 depicts one embodiment of a computing system, generally denoted 10, wherein the encryption key and encryption and decryption units are implemented within hardware embedded within each drive controller 20 on the computer. The hardware encryption and decryption could be either in the drive controller 20 (as shown), or in the drive itself, using the unique key 30 stored in the drive controller 20.

As shown in FIG. 1, computing system 10 also includes a processor 12 which runs a user application 14, executes a file system 16, and runs a device driver 18. As is well known, a storage system relies on software wherein each drive has an associated "file system" 16, which includes, among other things, software known as "device drivers" 18. Device drivers are low level executable modules capable of accessing (e.g., reading and writing), hardware components of the computer.

In the embodiment of FIG. 1, encryption key 30, encryption unit 32 and decryption unit 34 are assumed to be implemented in hardware within drive controller 20. Many personal computers have "drive controllers" which regulate the flow of data to and from a disk drive, floppy drive, etc. Common types of drive controllers include IDE (integrated drive electronics), SCSI (small computer system interface), and floppy drive controllers.

An encryption key may be embedded in the logic of a drive or drive controller. Contemporary drive controllers are often integrated into one chip with multiple functions. For example, one chip might serve as a PCI-to-ISA bus bridge, include one or more IDE drive controllers, and a controller for interrupts, direct memory access (DMA), one or more universal serial buses (USB's), power management, and other functions. An example of such a chip is the Intel 82371AB PCI-to-ISA/IDE Xcelerator (PIIX4) multifunction chip. The encryption key may be stored in a read-only register (or several registers, for the sake of redundancy) which is not externally accessible—that is, its contents are unknown to the outside world. The key would be accessed internally and used to operate on the data as it was multiplexed for transmission, for example, on an external bus to a storage medium such as a recordable CD-ROM, floppy disk, etc. The key may evolve by periodically clocking it through a linear-feedback shift register (LFSR). The decryption unit would access the same key and use it to reverse the encryption process again as the data was prepared for transmission on an external bus, destined for the system's main memory (DRAM) or another storage medium where it would reside as normal in-the-clear data.

In accordance with one embodiment of the present invention, when data is stored to storage device 22, hardware 32 automatically encrypts the data using unique encryption key 30, while upon fetching data from storage device 22, decryption unit 34 automatically decrypts the encrypted data again using the key 30. Any conventional encryption/decryption technique can be employed within encryption unit 32 and decryption unit 34 provided the technique employs an encryption/decryption key. As an enhancement, the system can be provided with an optional user input 35 to selectively direct the encryption unit 32 whether to encrypt data being stored to storage device 22. This optional user input could be implemented by one skilled in the art within hardware or software depending upon the computer system 10.

An alternate approach for implementing the concepts of the present invention would be to encrypt and decrypt the data at a level above the hardware, i.e., a level above the drive controller 20. For example, encryption and decryption, along with generation of an encryption key, could be implemented in software within the device driver, which accesses the drive. This approach, referred to herein as a software implementation, is depicted in FIG. 2.

Figure 2:
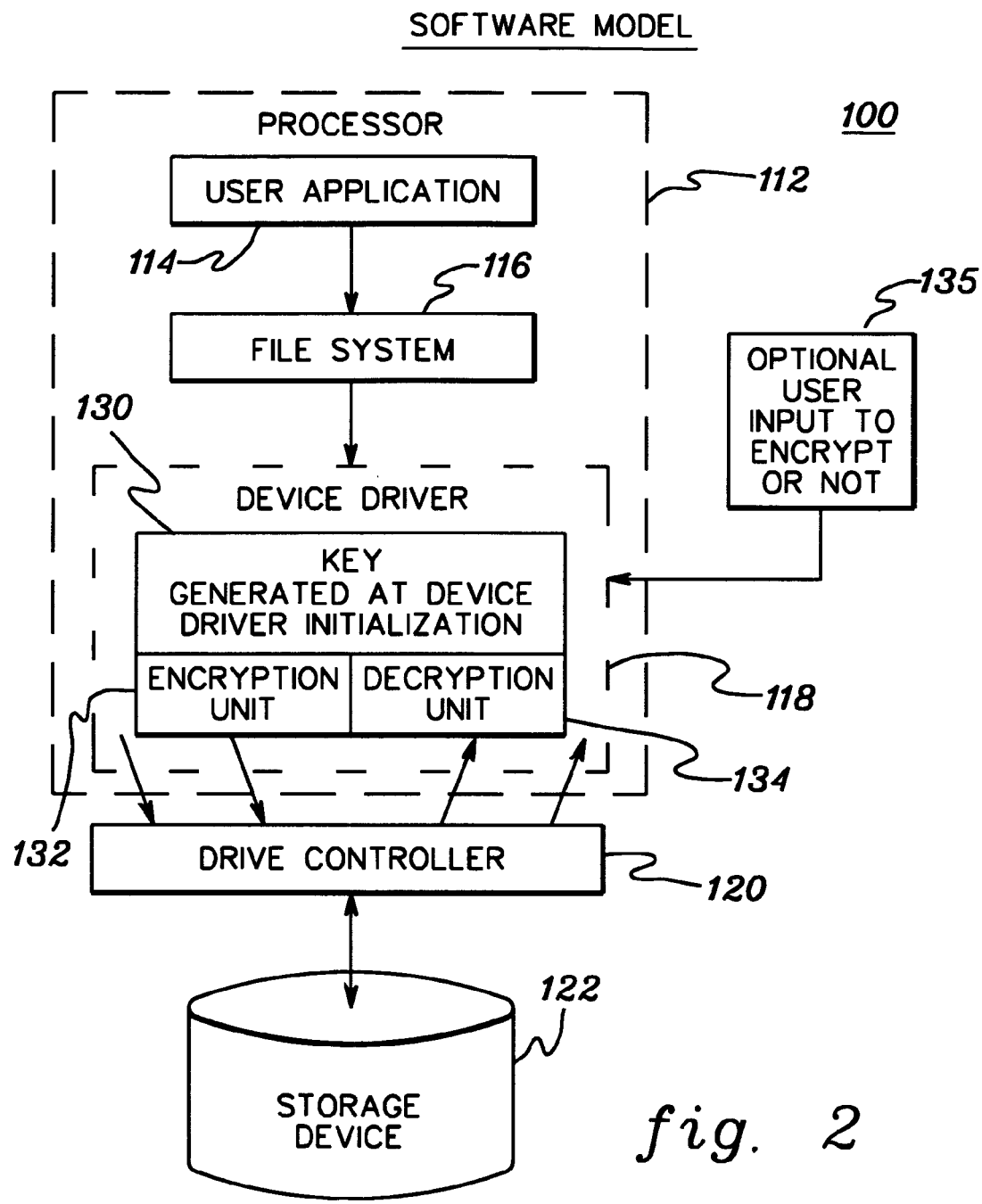
FIG. 2 depicts an alternate embodiment of a computing system implementing encryption/decryption capabilities in accordance with the principles of the present invention, wherein the encryption key is generated based upon unique properties of the host computing system and the encryption/decryption capabilities are implemented in software.

In the embodiment of FIG. 2, computing system 100 includes a processor 112 which runs a user application 114, file system programs 116 and at least one device driver module 118. The device driver module 118 includes a key generation routine 130 and the encryption 132 and decryption 134 software. As with the hardware implementation, one skilled in the art could provide a user with the option whether to encrypt or not selected data 135. Thus, data is shown passing through encryption unit 132 into drive controller 120 or outside of the encryption unit depending upon whether the user selects encryption. Further, any encryption/decryption algorithm known in the art could be implemented by one skilled in the art for use in connection with the present invention, provided that the selected encryption/decryption algorithm employed an encryption/decryption key. The encrypted data is forwarded by drive controller 120 to the storage device 122.

In the software approach, the encryption key could be derived (explained further below) when the computer boots.

For example, in one embodiment, the key could be stored in volatile (i.e., temporary) storage, and would be lost when the computer is powered off.

By providing a user with the optional input whether to designate particular data for encryption, it is possible to provide the user with the capability of deciding whether the data can be read back on any computing system, or only the computing system which wrote the storage medium. Further, a drive (or drive controller, or device driver) equipped with such optional encryption/decryption capability, might tag each file so that upon reading the file from storage, it is apparent whether the file does or does not require decryption.

Figure 3:
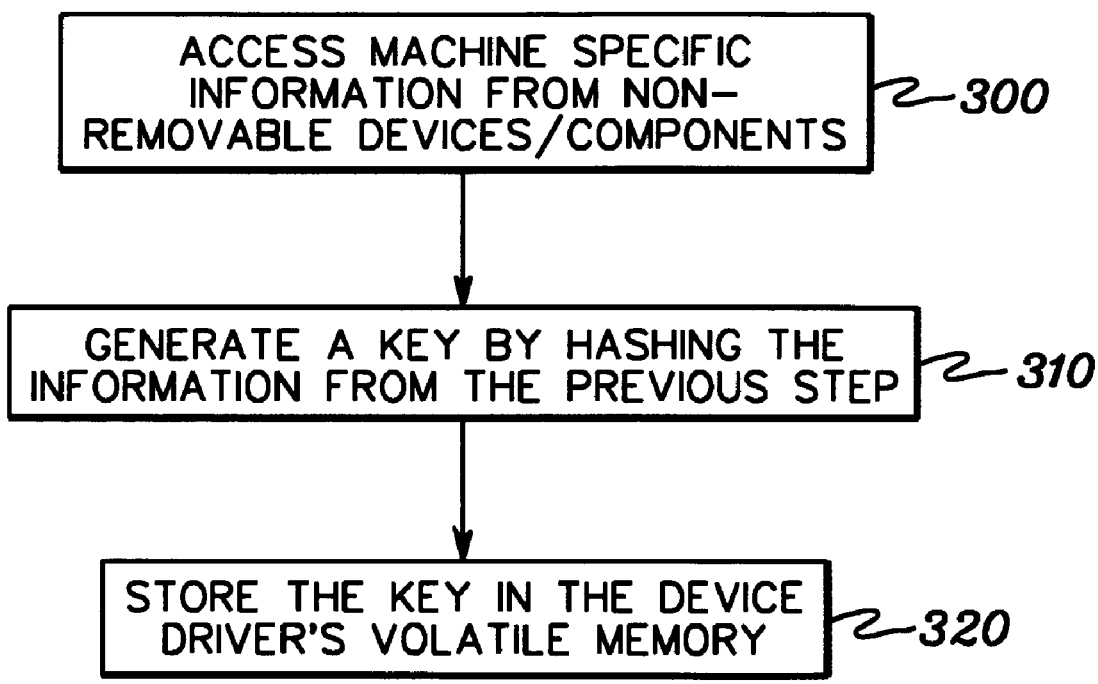
FIG. 3 is a flowchart of one embodiment for encryption key generation in software in accordance with the principles of the present invention.
Figure 4:
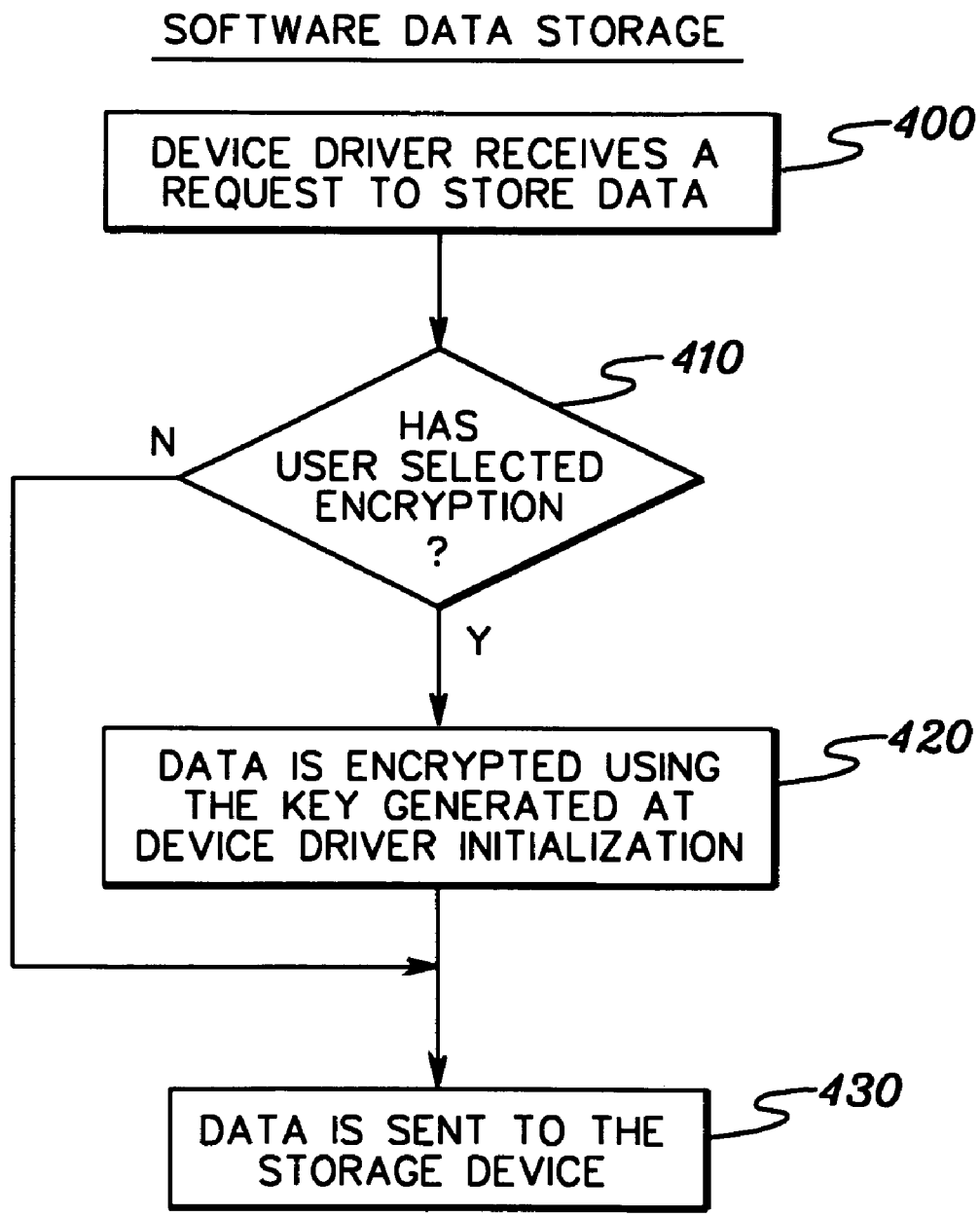
FIG. 4 is a flowchart of one embodiment for storing data encrypted in accordance with the capabilities of the present invention.
Figure 5:
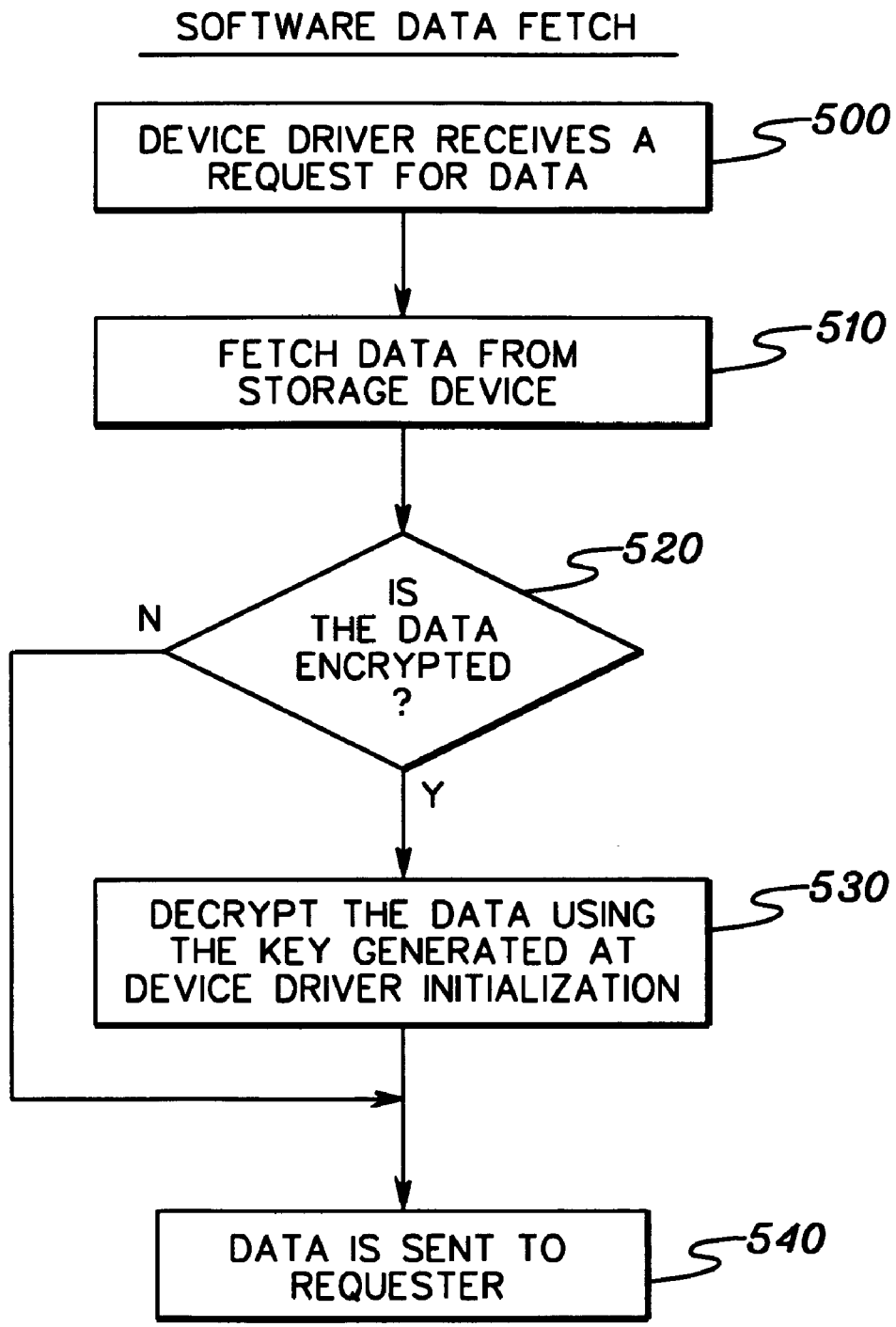
FIG. 5 is a flowchart of one embodiment for retrieving data encrypted in accordance with the capabilities of the present invention.

FIGS. 3-5 depict an overview of processing employed in a software implementation of the encryption/decryption capabilities of the present invention. In FIG. 3, a unique encryption key is generated, for example, at device driver initialization, by accessing machine-specific information from non-removable devices/components of the computing system 300. From this information, the key is generated by, for example, hashing the information 310, after which the key is stored in the device driver's volatile memory 320.

Many chips in a typical computer are irremovably mounted on a main circuit board, or motherboard. Such chips may include a main processor (a Pentium or the like), a video chip (or display adapter), an audio chip, and one or more adapters which link the processor's host bus, a peripheral component interconnect (PCI) bus, main memory (DRAM), accelerated graphics ports (AGP), drive controllers, bus bridges, etc. These chips may include unchanging readable information such as a chip ID or a serial number. Further, many chips are PCI devices—that is, they are connected by a PCI bus. The PCI Local Bus specification defines a mandatory configuration space to be implemented by each device resident on the bus. This configuration space has a 16-byte predefined header region followed by one of two types of secondary space. The header region contains several constant fields which may be accessed by low-level code (such as a device driver). Among these fields are the Device ID, the Vendor ID, the Revision ID, the Class Code, and the Header Type. Any of these or other consistently accessible, static registers of irremovable components, may be read and their contents combined to formulate a 'fingerprint,' a number which may serve as a encryption key.

Once the key has been established, then data can be selectively encrypted for storage. As shown in FIG. 4, the device driver initially receives a request to store data 400, and then inquires whether encryption has been selected 410. If so, then the data is encrypted using the key generated, for example, at device driver initialization 420. The encrypted data is then sent to the storage device 430. If the user has not selected encryption, then the data is directly sent to the storage device.

FIG. 5 depicts one embodiment of a data fetch operation which begins with the device driver receiving a request for data 500. The data is fetched from the storage device 510 and processing determines whether the data is encrypted 520. If so, the data is decrypted using the unique encryption key generated at device driver initialization 530. After decryption, or if the data has not been encrypted, the data is sent to the requester 540.

To summarize, presented herein is a technique wherein a number is embedded or derived that is unique to a particular computing system. By way of example, the number might include serial numbers or other identification numbers of certain non-removable components of the computer system. Alternatively, the computer might be manufactured with a "write-once" area into which a unique value could be placed by the user or at time of manufacture. This unique encryption key is then accessed as the user stores data for use in encrypting the data or decrypting the encrypted data. Preferably, the encryption and decryption is performed at a low level of the computer system, perhaps by the input/output (I/O) subsystem in a manner similar to that which data compression schemes operate. Further, the user can be provided with the option to selectively disable encryption.

The encryption key and encryption and decryption units can be implemented either in hardware or in software as discussed above. In either implementation, the unique encryption key which forms the basis for the encryption and decryption is not stored on the storage device. Presented herein is an encryption/decryption technique that is based on properties of the host machine, i.e., the encryption key employed to encrypt/decrypt data is unique to a number embedded within the machine or a number derived from non-removable components of the machine. Thus, the encryption/decryption can be transparent to the user and the user does not have to be involved in the encryption/decryption process. Further, no seed numbers need be presented to the computer from the outside world.

The unique encryption key could, in advance of enabling encryption, be provided to or fetched remotely by a system manufacturer and recorded by them. Thus, if a catastrophic failure occurred, such as a motherboard failure (for example), the hard drive could, using the recorded unique number, still have the data contents decrypted elsewhere, notwithstanding failure of the computing system which uniquely encrypted the data.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for protecting data written from a general purpose computer processor system to a removable storage device comprising drive logic and storage medium, said method comprising:

transparently generating a unique, non-accessible encryption key within a general purpose computer processor system, wherein the unique, non-accessible encryption key is generated from at least one unique hardware characteristic of the general purpose computer processor system without any seed data being presented to the general purpose computer processor system from outside the general purpose computer processor system;

automatically encrypting the data using said unique encryption key to produce encrypted data;

employing a removable storage device associated with the general purpose computer processor system to store said encrypted data without storing said unique encryption key on said removable storage device, said removable storage device comprising drive logic and storage medium, wherein encrypted data stored on the removable device can only be decrypted by the general purpose computer processor system establishing the unique, non-accessible encryption key;

wherein said automatically encrypting is transparent to a user application running on said general purpose computer processor system, said user application providing said data to be stored from said general purpose computer processor system to said storage medium of said removable storage device;

wherein said generating comprises embedding within hardware of said general purpose computer processor system said unique encryption key; and wherein said embedding comprises embedding said unique encryption key within a drive controller of said general purpose computer processor system.

2. The method of claim 1, wherein said encrypting comprises performing said encrypting in hardware using said unique encryption key embedded in said drive controller.

3. The method of claim 2, wherein said unique encryption key is embedded in two different locations within said drive controller of said general purpose computer processor system.

4. The method of claim 1, wherein said general purpose computer processor system comprises a laptop computer and said removable storage device comprises a computer hard drive of said laptop computer.

5. The method of claim 1, further comprising fetching said encrypted data from said removable storage device and automatically decrypting said encrypted data using said unique encryption key, said automatically decrypting being transparent to a user application running on said general purpose computer processor system.

6. The method of claim 5, wherein said encrypting comprises performing said encrypting in hardware using said unique encryption key, said hardware residing within a drive controller within said general purpose computer processor system, and wherein said decrypting comprises performing said decrypting in hardware residing within said drive controller within said general purpose computer processor system.

7. The method of claim 5, wherein said encrypting comprises encrypting said data in software using said unique encryption key, said encrypting being performed in software within a device driver of said general purpose computer processor system, and wherein said decrypting comprises decrypting said encrypted data in software using said unique encryption key, said decrypting also being performed in software within said device driver, wherein said encrypting and decrypting are transparent to a user application running on said general purpose computer processor system.

8. A system for protecting data written from a general purpose computer processor system to a removable storage device comprising drive logic and storage medium, said system comprising:

means for transparently generating a unique, non-accessible encryption key within said general purpose computer processor system, wherein the unique, non-accessible encryption key is generated from at least one unique hardware characteristic of the general purpose computer processor system without any seed data being presented to the general purpose computer processor system from outside the general purpose computer processor system;

means for automatically encrypting the data using said unique encryption key to produce encrypted data;

means for storing said encrypted data on a removable storage device associated with the general purpose computer processor system without storing said unique encryption key on said removable storage device, said removable storage device comprising drive logic and storage medium, wherein encrypted data stored on the removable storage device, can only be decrypted by the general purpose computer processor system establishing the unique, non-accessible encryption key;

wherein said means for automatically encrypting is transparent to a user application running on said general purpose computer processor system, said user application providing said data to be stored from said general purpose computer processor system to said removable storage device;

further comprising means for fetching said encrypted data from said storage medium and for automatically decrypting said encrypted data using said unique encryption key, said automatically decrypting being transparent to a user application running on said general purpose computer processor system; and wherein said means for generating comprises means for embedding within hardware of said general purpose computer processor system said unique encryption key, and wherein said means for embedding comprises means for embedding said unique encryption key within a drive controller of said general purpose computer processor system.

9. The system of claim 8, wherein said means for encrypting comprises means for performing said encrypting in hardware using said unique encryption key embedded in said drive controller.

10. The system of claim 9, wherein said unique encryption key is embedded in two different locations within said drive controller of said general purpose computer processor system.

11. The system of claim 8, wherein said general purpose computer processor system comprises a laptop computer and said removable storage device comprises a computer hard drive of said laptop computer.

12. The system of claim 8, wherein said means for encrypting comprises means for performing said encrypting in hardware using said unique encryption key, said hardware residing within a drive controller within said general purpose computer processor system, and wherein said means for decrypting comprises means for performing said decrypting in hardware residing within said drive controller within said general purpose computer processor system.

13. The system of claim 8, wherein said means for encrypting comprises means for encrypting said data in software using said unique encryption key, said encrypting being performed in software within a device driver of said general purpose computer processor system, and wherein said means for decrypting comprises means for decrypting said encrypted data in software using said unique encryption key, said means for decrypting also being implemented in software within said device driver, wherein said encrypting and decrypting are transparent to a user application running on said general purpose computer processor system.

14. A processing system comprising:
a removable storage device for storing data, the removable storage device comprising drive logic and storage medium;
a general purpose computer processor system adapted to transparently generate a unique, non-accessible encryption key, wherein the unique, non-accessible encryption key is generated from at least one unique hardware characteristic of the general purpose computer processor system without any seed data being presented to the general purpose computer processor system from outside the general purpose computer processor system, and to automatically encrypt data using said unique encryption key to produce encrypted data, said general purpose computer processor system further comprising a drive controller for storing encrypted data to said removable storage device, wherein encrypted data stored on the removable storage device can only be decrypted by the general purpose computer processor system establishing the unique, non-accessible encryption key, and wherein said automatically encrypting is transparent to a user application running on said general purpose computer processor system, said user application providing said data to be stored from said general purpose computer processor system to said storage medium of said removable storage device; and
wherein said general purpose computer processor system includes an encryption unit and a decryption unit implemented in software such that encryption of data stored to said removable storage device and decryption of data retrieved from said removable storage device is transparent to an application program running on said general purpose computer processor system, and wherein said unique encryption key is generated at initialization and stored in volatile memory.

15. The processing system of claim 14, wherein said general purpose computer processor system includes an encryption unit and a decryption unit implemented in hardware within said drive controller such that encryption of data stored to said removable storage device and decryption of data retrieved from said removable storage device is transparent to an application program running on said general purpose computer processor system, and wherein said unique encryption key is embedded within said drive controller for use by said encryption unit and said decryption unit.

16. At least one program storage device readable by a machine, tangibly embodying at least one program of instructions executable by the machine to perform a method for protecting data written from a general purpose computer processor system to a removable storage device comprising drive logic and storage medium, comprising:
transparently generating a unique, non-accessible encryption key within a general purpose computer processor system, wherein the unique, non-accessible encryption key is generated from at least one unique hardware characteristic of the general purpose computer processor system without any seed data being presented to the general purpose computer processor system from outside the general purpose computer processor system;
automatically encrypting the data using said unique encryption key to produce encrypted data;
storing said encrypted data on a removable storage device without storing said unique encryption key on said removable storage device, said removable storage device comprising drive logic and storage medium, wherein encrypted data stored on the removable storage device can only be decrypted by the general purpose computer processor system establishing the unique, non-accessible encryption key;
wherein said automatically encrypting is transparent to a user application running on said general purpose computer processor system, said user application providing said data to be stored from said general purpose computer processor system to said storage medium of said removable storage device;
further comprising fetching said encrypted data from said removable storage device and automatically decrypting said encrypting data using said unique encryption key, said automatically decrypting being transparent to a user application running on said general purpose computer processor system; and
wherein said generating comprises embedding within hardware of said general purpose computer processor system said unique encryption key, and wherein said embedding comprises embedding said unique encryption key within a drive controller of said general purpose computer processor system.

17. The at least one program storage device of claim 16, wherein said encrypting comprises performing said encrypting in hardware using said unique encryption key embedded in said drive controller.

18. The at least one program storage device of claim 16, wherein said encrypting comprises performing said encrypting in hardware using said unique encryption key, said hardware residing within a drive controller within said general purpose computer processor system, and wherein said decrypting comprises performing said decrypting in hardware residing within said drive controller within said general purpose computer processor system.

19. The at least one program storage device of claim 16, wherein said encrypting comprises encrypting said data in software using said unique encryption key, said encrypting being performed in software of said general purpose computer processor system, and wherein said decrypting comprises decrypting said encrypted data in software using said unique encryption key, said decrypting also being performed in software, wherein said encrypting and decrypting are transparent to a user application running on said general purpose computer processor system.

* * * * *